United States Patent [19]
Oda et al.

[11] Patent Number: 5,245,382
[45] Date of Patent: Sep. 14, 1993

[54] INSTANT PHOTOGRAPHIC COPIER

[75] Inventors: Hajime Oda; Takuma Takahashi, both of Chiba, Japan

[73] Assignee: Seikosha Co., Ltd., Tokyo, Japan

[21] Appl. No.: 902,602

[22] Filed: Jun. 23, 1992

[30] Foreign Application Priority Data

Jun. 24, 1991 [JP] Japan ................... 3-151336

[51] Int. Cl.[5] .................. G03B 27/48; G03B 27/50
[52] U.S. Cl. ............................ 355/1; 355/27; 355/46; 355/50
[58] Field of Search ............... 355/1, 46, 50, 84, 27

[56] References Cited

U.S. PATENT DOCUMENTS

| 4,956,665 | 9/1990 | Niles | 355/50 |
| 4,972,224 | 11/1990 | Thompson | 355/1 |
| 4,987,441 | 1/1991 | Hudspeth | 355/50 |
| 5,164,763 | 11/1992 | Masanori et al. | 355/27 |

FOREIGN PATENT DOCUMENTS 0110381 11/1982 European Pat. Off.

*Primary Examiner*—Richard A. Wintercorn
*Attorney, Agent, or Firm*—Jordan and Hamburg

[57] ABSTRACT

A photographic copier includes a rod lens array held to a carrier and moved parallel to an original picture by a motor. Limit switches sense whether the array is in either stop position at both ends of the range of movement. During movement, if the array is found to reach either stop position, then a control circuit stops the operation of the motor. When the rod lens array is started, if the limit switches sense that the rod lens array is not in either stop position, then the control circuit operates the motor to return the array to either stop position.

10 Claims, 7 Drawing Sheets

INSTANT PHOTOGRAPHIC COPIER

FIELD OF THE INVENTION

The present invention relates to an instant photographic copier for duplicating original pictures or the like.

BACKGROUND OF THE INVENTION

The present applicant has proposed an instant photographic copier which has a simple construction and produces copies with high quality by simple operations, as disclosed in Japanese Patent Application Nos. 331617/1989, 331618/1989, and 333628/1989. In particular, this copier eliminates the complexity of the setting of close-up conditions when a copy is made, using a camera and close-up equipment. The copier also removes the effects of the lens aberration and so on. Furthermore, the copier eliminates the complexity of configuration and prevents an increase in the load on the circuit when a copy is made, using a scanner type image reader equipped with CCDS.

In this apparatus, a rod lens array is moved parallel to the original picture while illuminating it with a fluorescent lamp. Small regions of the original picture are successively focused onto the photosensitive surface of the instant film. The rod lens array is carried on a carrier and driven via the carrier.

The carrier is moved along a guide shaft Limit switches (hereinafter indicated by SW) are disposed on opposite sides of the region in which the carrier moves, to limit this region. When a copy of the original is to be made, the carrier which is close to one limit switch SW that is closed moves close to the other limit switch SW and arrives at a given position, thus closing the other switch SW. Then, the operation of the carrier is stopped. Accordingly, when duplication is not effected, the carrier moves close to either limit switch and bears on it, closing it.

The carrier may be moved out of position by transportation, vibration, shock, or for other causes. Also, the user may intentionally move the carrier In these cases, the carrier is not in position and there is the possibility that both limit switches SW are open. Under this condition, if the start switch is depressed, it is not known in which direction the carrier should be moved. Consequently, poor duplication is made.

When an instant film is loaded in the device, if the carrier is out of position and passes beyond a given position, then it follows that the film may be exposed by the light from the rod lens array.

One conceivable means for solving the foregoing problem is to provide a lock mechanism to lock the carrier in a given position at which one of the limit switches SW disposed on opposite sides of the device is closed. When the apparatus is not in use, the opening of the rod lens array is blocked by a shading member. When the start switch is depressed, the opening is opened.

In this case, however, the whole apparatus is complex in structure and large in size The apparatus is especially unsuited for portability.

SUMMARY OF THE INVENTION

It is an object of the present invention to provide an apparatus which has a simple construction but can create good copies even if the carrier is moved out of position due to transportation, vibration, shock, or user's intentional movement. It is another object of the invention to provide an apparatus which informs the user of a possibility of unsuccessful duplication to thereby prevent unsuccessful duplication It is a further object of the invention to provide an apparatus which prevents wasteful use of film. It is a yet other object of the invention to provide an apparatus whose whole structure is not complex and thus is not large in size.

A first feature of the novel instant photographic copier is that it comprises an illuminating means that illuminates a subject. An optical means focuses small regions of the subject onto the photosensitive surface of an instant photosensitive material. A driving means moves the optical means parallel to the subject. A detection means senses whether the optical means is in either of stop positions at both ends of the range in which the optical means moves. A control means stops operation of the driving means when the detection means senses that the optical means has arrived at either stop position during movement of the optical means and operates the driving means to return the optical means to either stop position when the optical means is started and the detection means detects the absence of the optical means at either stop position.

In a second feature of the invention, a warning means is provided which is operated by the control means when the optical means is started and the detection means detects an absence of the optical means at either stop position.

In a third feature of the invention, when a warning means is provided, when the optical means is started if the detection means detects an absence of the optical means at either stop position, and if the optical means is returned to either stop position within a given time, the control means stops operation of the warning means to cancel the warning.

In a fourth feature of the invention, when a warning means is provided, the control means is equipped with a storage means for storing the stop position of the optical means. At the time of start-up, if the stop position of the optical means detected by the detection means differs from the stop position of the optical means stored in the storage means, the control means operates the warning means to issue a warning.

In a fifth feature of the invention, when a warning means is provided, the control means controls the operation of the illuminating means to illuminate the subject either only when no warning is issued at the time of start-up or when a warning is cancelled.

In operation, optical means is moved parallel to the subject by the driving means while the subject is being illuminated by the illuminating means to focus small regions of the subject onto the photosensitive surface of the instant photosensitive material The detection means senses whether the optical means is in either of the stop positions at opposite ends of the range in which the optical means moves. When the detection means senses that the optical means has arrived at either stop position during movement of the optical means, the control means stops operation of the driving means. At the time of start-up, if the detection means senses that the optical means is not in either stop position, then the control means operates the driving means to return the optical means to either stop position, thus permitting the optical means to operate normally.

BRIEF DESCRIPTION OF THE DRAWINGS

In order that the invention may be more clearly understood, it will now be disclosed in greater detail with reference to the accompanying drawings, wherein.

Figure 5:
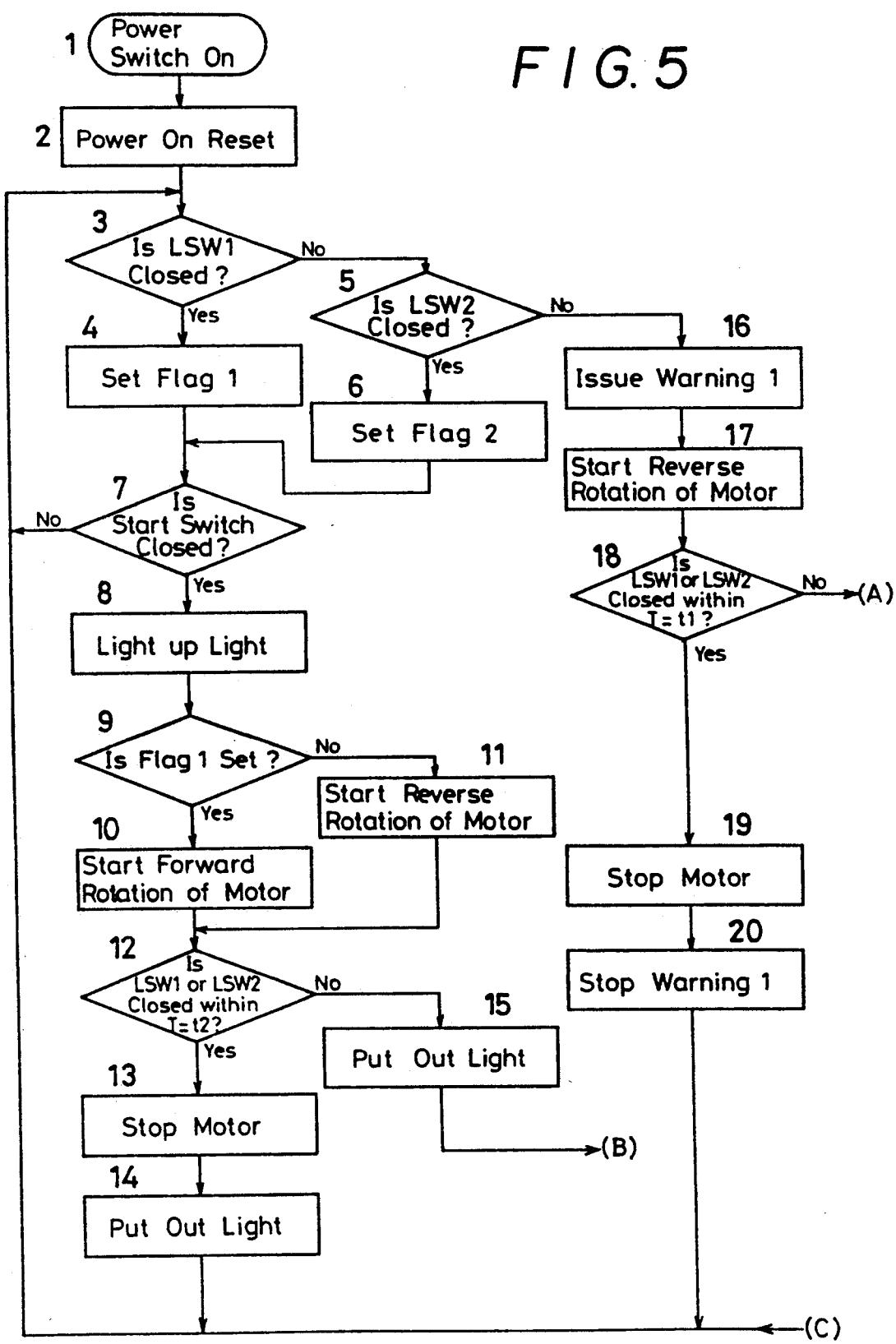
Figure 6:
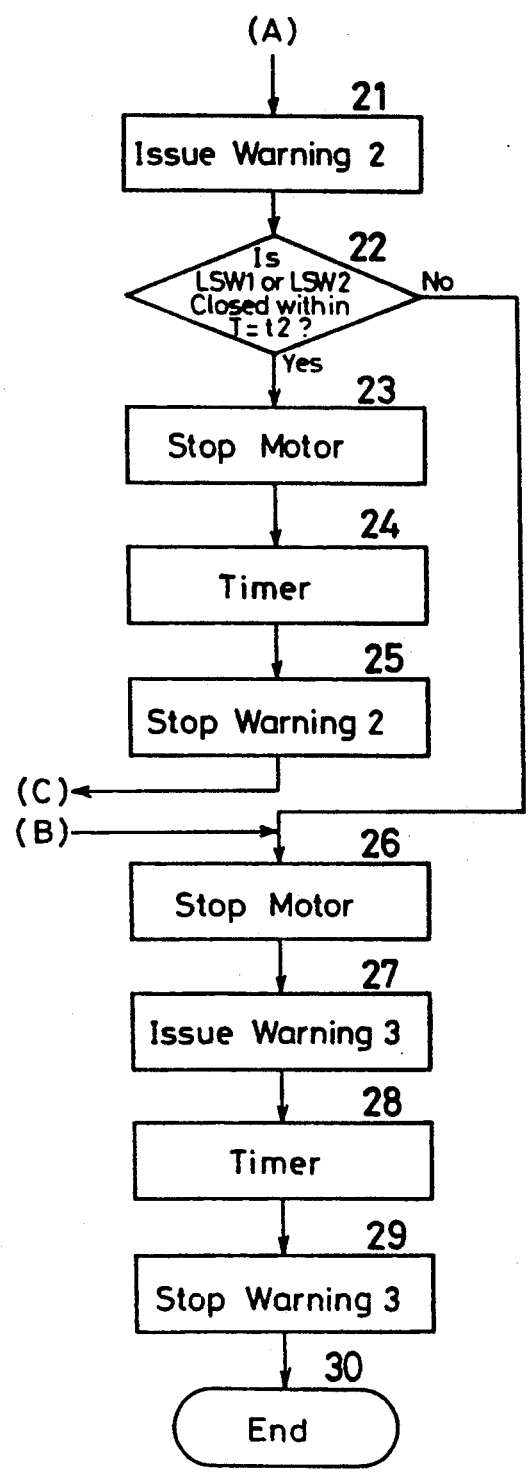
Figure 7:
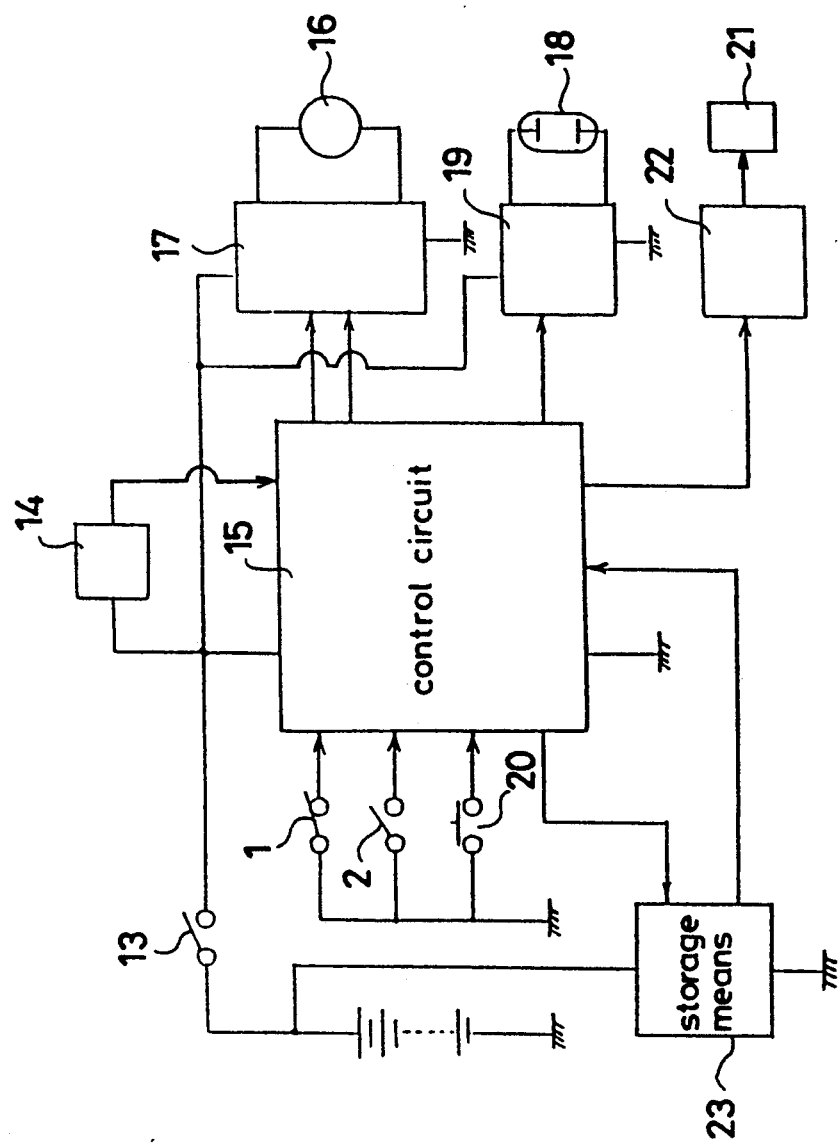
Figure 8:
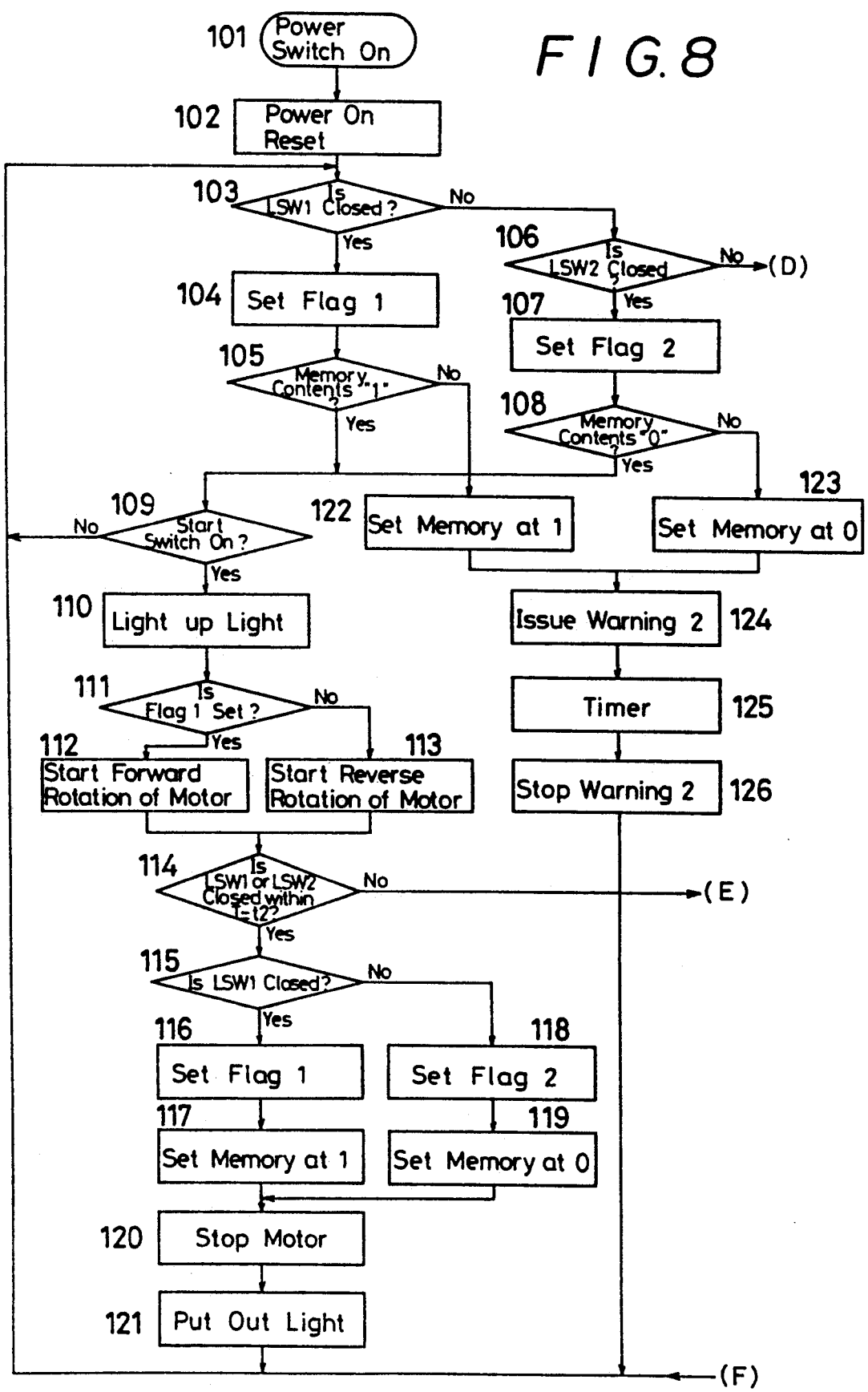
Figure 9:
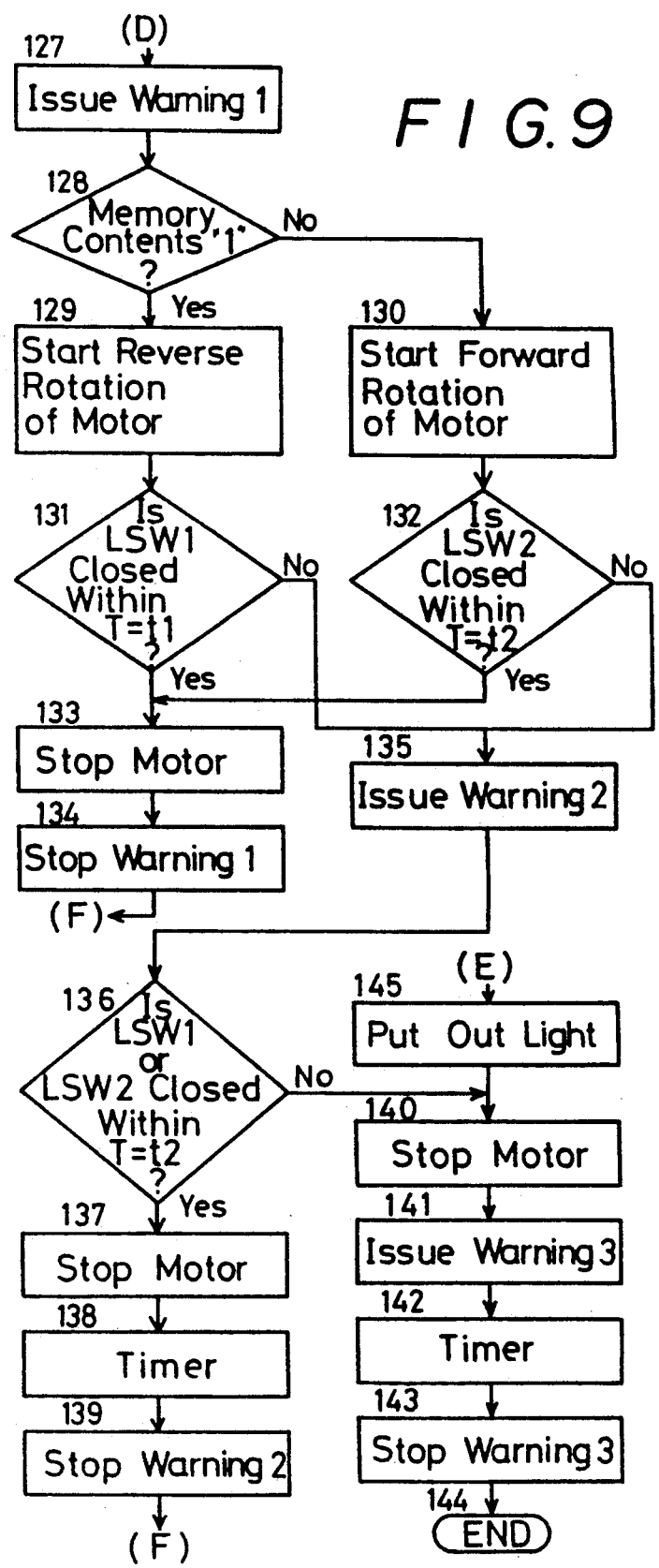

4 is a cross-sectional view showing the condition in which the carrier is outside a second shading means;

FIG. 5 is a flowchart illustrating operation of the first embodiment of the invention;

FIG. 6 is a further flowchart illustrating operation of the first embodiment of the invention;

FIG. 7 is a circuit block diagram of a second embodiment of the invention;

FIG. 8 is a flowchart illustrating operation of the second embodiment of the invention; and FIG. 9 is a further flowchart illustrating operation of the second embodiment of the invention.

DESCRIPTION OF THE PREFERRED EMBODIMENTS

A first embodiment of the invention sill now be described with reference to FIGS. 1 to 6.

Figure 1:
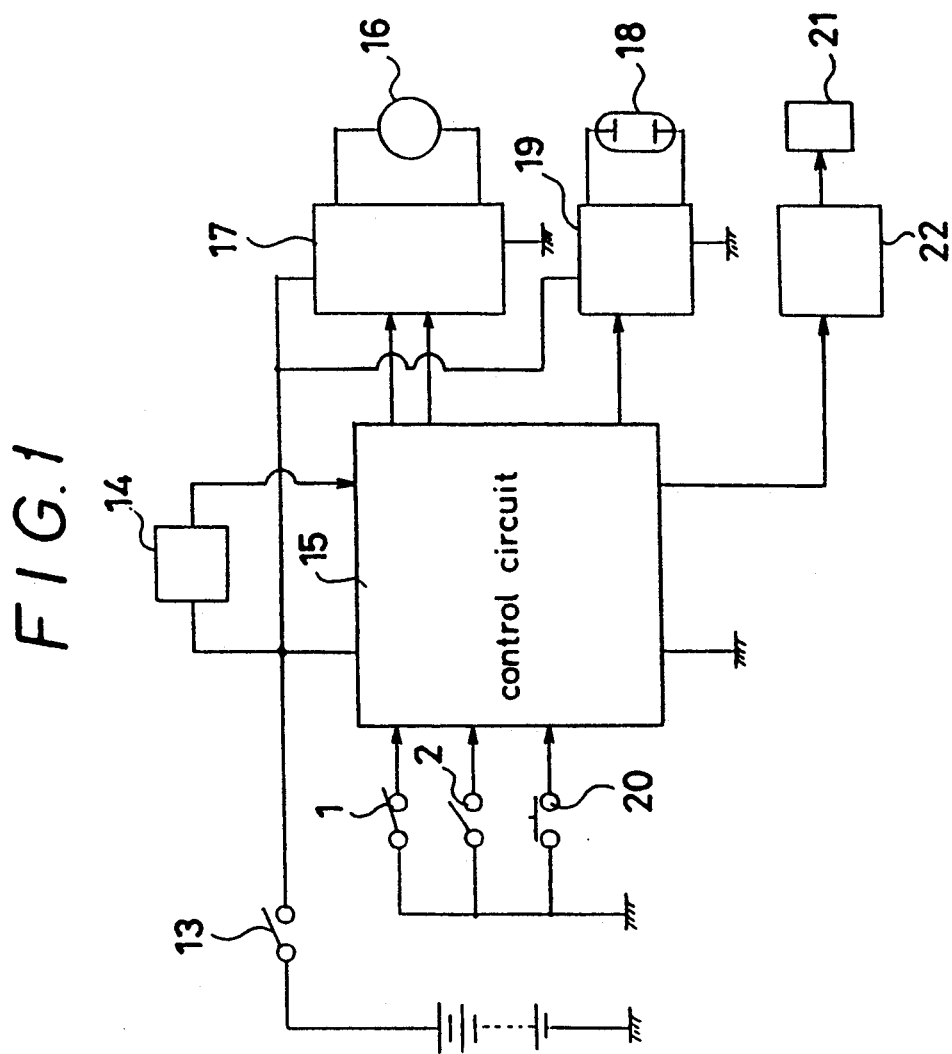
FIG. 1 is a circuit block diagram showing a first embodiment of the invention.
Figure 2:
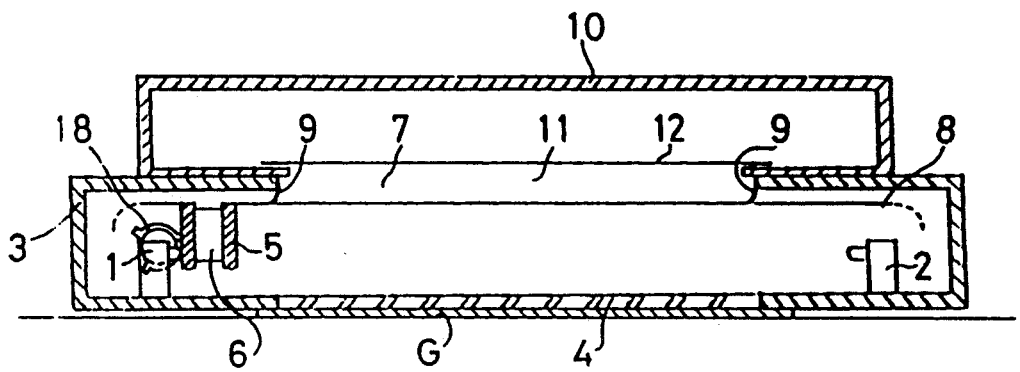
FIG. 2 is a cross-sectional view showing the relation between a carrier and limit switches in the present invention.

In order to duplicate an original picture G, a case 3 is placed on the original picture G comprising a subject, as shown in FIG. 2. A transparent plate 4 is mounted at the bottom of the case 3. The original picture G is placed opposite to this transparent plate 4. Limit switches 1 and 2 are detection means that are rigidly fixed to the inner surface of the bottom of the case and are mounted on opposite sides inside the case. Rod lens array 6 comprises an optical means mounted between the limit switches 1 and 2. For example, a Selfock Lens Array can be used as the rod lens array. This rod lens array 6 is carried on a carrier 5 and can move together with the carrier 5. The carrier 5 can reciprocate parallel to the original picture G along a guide shaft (not shown) between the limit switches 1 and 2. The carrier 5 is driven by the driving force of a motor 16 (FIG. 1) via a motor-driving circuit 17 (FIG. 1). The carrier 5 can make contact with switch contacts of the limit switches 1 and 2 on opposite sides of the case. Therefore, it can be determined whether the rod lens array 6 is in either of the positions at opposite ends of the range of movement. The carrier 5 is equipped with an illuminating means 18. The carrier 5 is driven while the original picture G is being illuminated by the illuminating means 18.

A film cassette 10 is supported on the case 3 An instant film 12 comprising an instant photosensitive material positioned inside a lower opening portion 11 in the film cassette.

A first shading means 8 is mounted below an upper opening portion 7 in the case 3. A second shading means 9 is mounted on the fringe of this opening portion. When the carrier 5 is in the position shown in FIG. 3, the second shading means 9 prevents exposure of the instant film 12 with certainty.

In FIG. 1, a power on reset circuit 14, a control circuit 15, the motor driving circuit 17, and an illuminating means-driving circuit 19 that activates the illuminating means 18 are connected to a power switch 13.

The limit switches 1 and 2 and a start switch 20 are connected in parallel with the control circuit 15. The power on reset circuit 14 is also connected to the control circuit 15. The driving circuit 17 and the illuminating means-driving circuit 19 are controlled by the control circuit 15, which also controls a warning means-driving circuit 22 that drives a warning means 21. The warning means 21 may be a light-emitting means or a sound-producing means.

The operation of the system will now be described with reference to FIGS. 5 and 6

As illustrated in FIG. 5, when the power switch 13 is closed (step 1), the power on reset circuit 14 initializes the control circuit 15 (step 2). The conditions of the limit switches 1 and 2 are checked. If the limit switch 1 is closed, flag 1 is set. If the limit switch 2 is closed, flag 2 is set. In either case, the apparatus waits until the start switch 20 is closed (steps 3, 4, 5, 6 and 7).

When the start switch 20 is closed, the light 18 is lit (steps 7 and 8). A check is made to ascertain whether flag 1 is set (step 9). If flag 1 is set, the control circuit 15 produces an identification signal indicating that the carrier 5 is on the side of the limit switch 1 as shown in FIG. 2. Then, the motor 16 is rotated in a forward direction to move the carrier 5 from the side of the limit switch 1 to the side of the limit switch 2 (step 10).

If flag 2 is set, it follows that the carrier 5 is in contact with the limit switch 2. Thus, the motor 16 is rotated in reverse to carry the carrier 5 from the side of the limit switch 2 to the side of the limit switch 1 (step 11).

If the time T for which the carrier 5 moves, i.e., the time between the instant at which the carrier 5 begins to move and the limit switch 1 is opened and the instant at which the carrier makes contact with the limit switch 1 to close it, is shorter than an assumed time t2 (step 12), i.e., the carrier contacts the limit switch 2 and closes it in accordance with the relation $T \leq t2$, it follows that the carrier is operating normally. Therefore, when the limit switch 2 is closed, the motor 16 is stopped (step 13). The light is turned off (step 14). Again, a check is made to see whether the limit switch 1 or the limit switch 2 is closed (step 3 or 5). A flag is set. The apparatus waits until the start switch 20 is closed.

In step 12, if the limit switch 2 or 1 is not closed after a lapse of the assumed time t2, then it is determined that some mechanical trouble or trouble with one of the limit switches has occurred. The light 18 is turned off (step 15). The motor 16 is stopped (step 26) as illustrated in FIG. 6. A warning 3 is issued for a given time (step 27).

In steps 28-30, if the warning condition persists for a given time, the timer is deactivated. Therefore, the warning 3 is cancelled. Hence, the duplication operation is stopped.

The case in which none of the limit switches 1 and 2 are closed if the power switch 13 is closed is next described.

Figure 3:
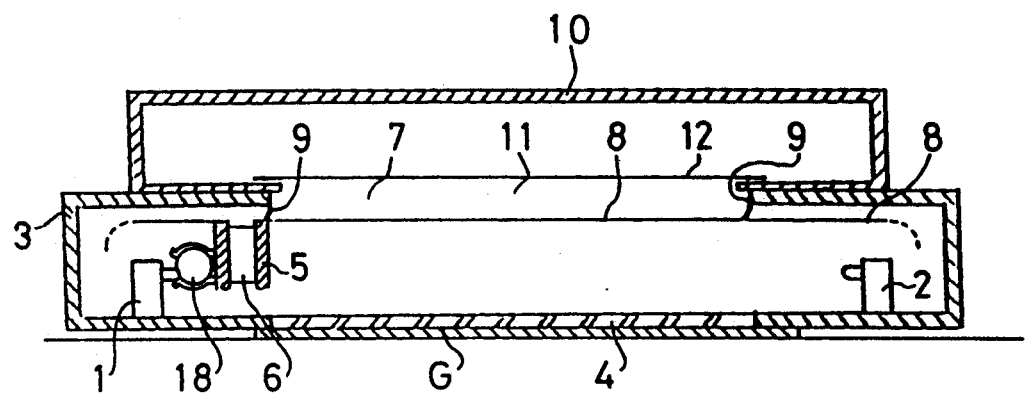
FIG. 3 is a cross-sectional view showing the condition in which the carrier is slightly spaced from a limit switch SW1.

In this case, a warning 1 is produced (step 16) to reverse the motor 16 (step 17). Thus, the carrier 5 is urged to return from the side of the limit switch 2 to the side of the limit switch 1. At this time, if the rod lens array 6 is located inside the second shading means 9 on the side of the limit switch 1 as shown in FIG. 3, then the instant film 12 has not been exposed If the limit switch 1 is closed within an assumed time t1 that is taken for the carrier to go back to the limit switch from that extreme location, then the motor 16 is brought to a stop (step 19). The warning 1 is discontinued (step 20). The carrier is returned to its normal position Then, control goes back to step 3.

Figure 4:
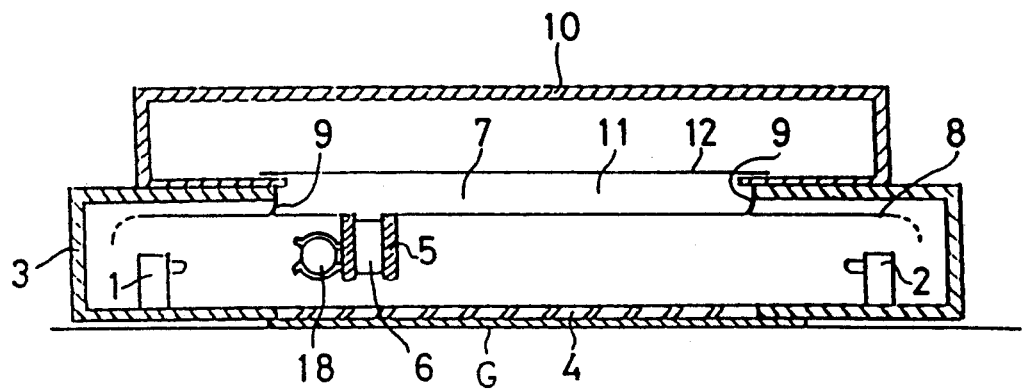

If the carrier 5 is outside or to the right of the second shading means 9 as shown in FIG. 4, then it is considered that the instant film 12 has been exposed.

At this time, the carrier 5 is returned to the side of the limit switch 1. If the time T1 required to close the limit switch satisfies the relations $t1 < T1 \leq t2$, then the result of the decision is that no mechanical trouble has taken place. As illustrated in FIG. 6, a warning 2 is issued (step 21) to stop the motor 16 (step 22). After the timer detects the elapse of a given time (step 24), the warning 2 is discontinued (step 25). The carrier is then returned to its normal position Control then goes to step 3.

A second embodiment of the invention will now be described with reference to FIGS. 7 to 9.

A situation may be contemplated in which the carrier 5 is inside or to the right of the second shading means 9 on the side of the limit switch 2. Also in this case, the carrier 5 is returned toward the limit switch 1 and so the instant film 12 might be wasted by the aforementioned method of operation. This problem is solved by the present embodiment This embodiment is similar to the first embodiment described above except for this point.

The difference between the present embodiment and the first embodiment is that a storage means or a memory 23 is provided which is directly connected to a power supply such as batteries as shown in FIG. 7, consumes a very small amount of electric power, and stores the stop position of the rod lens array 6. This storage means 23 serves to store the conditions of the limit switches 1 and 2. When the power switch 13 is opened, the present condition of the limit switches is stored in the storage means.

That is, the storage means stores the conditions of the switches when the latest operation was performed.

The method of operating the apparatus in accordance with this embodiment will now be described.

As illustrated in FIG. 8, the power switch 13 is closed to activate the power on reset circuit (steps 101 and 102). The conditions of the limit switches 1 and 2 are checked and flags are set (steps 103, 104, 106 and 107). At this time, the condition of the memory is checked. If the limit switch 1 was closed in the previous condition, the contents of the memory are "1". If the limit switch 2 was closed, the contents of the memory are "0". If the present condition agrees with the previous condition, then the apparatus waits until the start switch 20 is closed (steps 105, 108 and 109).

When the start switch 20 is closed, the light is lit. The motor 16 is driven. Subsequently, operations are carried out in the same manner as the foregoing (steps 109 and 121). However, in this series of operations, the memory is reset simultaneously with setting of a flag (steps 117 and 119).

When normal operation is being carried out, control goes from steps 109, 110, 112 (or 113) to steps 114, 115 and then to steps 116, 117 (or 118, 119), 120, 121. Then, control returns to step 103.

If an abnormal operation is performed, the time T required for the carrier 5 exceeds the assumed time t2. Therefore, control goes from steps 109, 110, 112 (or 113) to step 114 and then to steps 145, 140, 141, 142, 143 and 144.

If the present condition differs from the previous condition, e.g., the present condition is different from the previous condition though either the limit switch 1 or 2 is closed, then it follows that the user has intentionally moved the carrier 5 to the opposite side. This is an unusual case. The memory is reset to the present condition. The warning 2 is issued for a given time to warn the user of the possibility of exposure of the instant film 12.

In this case, control goes from step 105 (or step 108) to step 122 (or step 123) and then to steps 124, 125, 126, and back to step[ 103.

If none of the limit switches 1 and 2 are closed in steps 103 and 106, the warning 1 is issued as illustrated in FIG. 9. If the limit switch 1 was closed in the previous condition in steps 127 and 128, then the motor 16 is reversed (step 129). If the limit switch 2 was closed in the previous condition, the motor 16 is rotated in a forward direction (step 130). If the time T required for the carrier 5 to close either limit switch satisfies the condition $T \leq t1$, then the warning is discontinued. The apparatus waits until the start switch 20 is closed (steps 128, 129 (or 130), 131 (or 132), 133, 134, 103).

If $t1 < T \leq t2$, it follows that the carrier 5 is outside the second shading means 9. Control goes to steps 131 (or 132), 135, 136, 137, 138, and 139.

If $T > t2$, control goes to steps 136, 140, 141, 142, 143, and 144.

In the embodiments described above, the light is lit only when all the components are normal and, at the same time, the start switch 20 is depressed The light is not lit when the carrier 5 is located inside the second shading means 9. Consequently, the possibility that the instant film 12 is exposed can be eliminated.

With respect to the warnings, the warning 1 indicates that the carrier 5 is not in position at the time of start and that the instant film 12 is not yet exposed. Hence, this condition can be regarded as lying within the normal range.

It is to be noted that the warning 1 can be neglected.

The warning 2 informs the user that the instant film 12 may be exposed.

The warning 3 indicates a mechanical trouble with the mechanism of the copier itself, e.g., malfunction of the motor 16 or the limit switches.

The warnings 1, 2 and 3 may be displayed on the same device by changing the pattern displayed or the pattern of produced sound. Also, separate devices may be mounted for the warnings. In the illustrated flowchart, the warnings 2 and 3 are discontinued within a given time. The warnings may be continued until the power supply is turned off. The instant film 12 may be of the automatic pullout type or automatic withdrawal type. With respect to the warning 2, a switch which senses that the instant film has been pulled out or withdrawal has been completed may be provided. The warning 2 may be discontinued according to the output signal from this switch. When the warning 2 is issued, the automatic withdrawal mechanism may be activated to inhibit start. That is, the start is not allowed unless the instant film is withdrawn. Alternatively, the warning 2 may be continued until the instant film is withdrawn.

In the embodiments described above, the aforementioned warnings are issued when the power switch is closed. Alternatively, the above-described detection operation may be performed when the start switch is closed, and then the warning may be issued.

In accordance with the present invention, if the optical means is shifted out of either stop position due to transportation, vibration, or the like, the optical means is returned to the stop position by the control means. Therefore, the apparatus can prevent unsuccessful duplication though the apparatus is simple in structure. The apparatus can create good copy. Also, an increase in the size can be prevented. If the optical means is out of position, the control means and the warning means cooperate to warn the user that the copy may be made unsuccessfully. Consequently, the user can know the possibility of failure of duplication. This is convenient for the user. The time required for the optical means to be returned to its given position is detected. Then, if no problem is found, the warning is cancelled. Hence, the instant film is not wasted, which is economically advantageous. In addition, the storage means which stores the stop position of the optical means is provided. As a consequence, the effects described above can be enhanced further.

Since the illuminating means is lit only when the apparatus is operating normally, the possibility of exposure of the instant photosensitive material can be reduced.

Although the present invention has been fully described by way of example with reference to the accompanying drawings, it is to be understood that various changes and modifications will be apparent to those skilled in the art. Therefore, unless such changes and modifications depart from the scope of the invention, they should be construed as being included therein.

What we claim is:

1. A instant photographic copier comprising:
   an illuminating means for illuminating a subject;
   an optical means mounted to focus small regions of the subject onto the photosensitive surface of an instant photosensitive material;
   a driving means connected to move the optical means parallel to the subject;
   a detection means positioned to sense whether the optical means is in either stop position at opposite ends of the range in which the optical means moves; and
   a control means responsive to the sensing by detection means that the optical means has arrived at either stop position during movement of the optical means for stopping operation of the driving means, said control means being responsive to the starting of the optical means and the detection by the detection means of the absence of the optical means at either stop position for operating the driving means to return the optical means to either stop position.

2. The instant photographic copier of claim 1 further comprising a warning means connected to be operated by the control means when the optical means is started and the detection means detects an absence of the optical means at either stop position.

3. The instant photographic copier of claim 2, wherein the control means is connected to stop operation of the warning means to cancel a warning when the optical means is started, if the detection means detects an absence of the optical means at either stop position, and the optical means is returned to either stop position within a given time.

4. The instant photographic copier of claim 2, wherein said control means is equipped with a storage means for storing the stop position of the optical means, and wherein the control means is responsive to the start of the optical means, if the stop position of the optical means detected by the detection means differs from the stop position of the optical means stored in the storage means, for operating the warning means to issue a warning.

5. The instant photographic copier of claim 2, wherein said control means comprises means for contacting the operation of the. illuminating means to illuminate the subject only when either no warning is issued at the time of start-up or when a warning is cancelled.

6. An instant photographic copier, comprising:
   means for illuminating a subject to be copied;
   means for supporting an instant photographic material in a given focal plane
   means for focusing regions of the image of said subject on said focal plane;
   driving means for moving said focusing means in first and second opposite directions parallel to said subject, whereby said focusing means focuses different regions of the image of said subject on said focal plane, whereby said focusing means has first and second end positions responsive to said movement thereof in said first and second directions, respectively;
   first and second sensing means for sensing the positioning of said focusing means at said first and second end positions, respectively; and
   control means responsive to the sensing of said focusing means at said first and second end positions following movement thereof in said first and second directions respectively, for stopping said driving means, said control means being further responsive to the absence of said focusing means at either of said first and second end positions, prior to movement thereof by said driving means, for controlling said drive means to drive said focusing means to one of said end positions.

7. The instant photographic copier of claim 6 further comprising warning means, said control means further comprising means for energizing said warning means when said driving means is started, in the absence of sensing by said sensing means of positioning of said focusing means at either of said first and second end positions.

8. The instant photographic copier of claim 7, wherein said control means further comprises means for stopping the energization of said warning means in response to said absence of sensing of positioning of said focusing means at either of said first and second end positions, if said sensing means senses the positioning of said focusing means at either of said first and second end position within a predetermined time.

9. The instant photographic copier of claim 6 further comprising means for storing the last one of said first and second end positions at which said focusing means was located, and means for energizing said warning means in response to the absence of said focusing means at the stored position upon the starting of said driving means.

10. The instant photographic copier of claim 7, wherein said control means comprises means for energizing said illuminating means only in the absence of energization of said warning means.

* * * * *